United States Patent
de los Santos Campos et al.

(10) Patent No.: US 9,329,352 B2
(45) Date of Patent: May 3, 2016

(54) SLACK CABLE STORAGE APPARATUS

(75) Inventors: Cesar Alejandro de los Santos Campos, Tamaulipas (MX); Selene Elizabeth Hernandez-Ariguznaga, Tamaulipas (MX)

(73) Assignee: Corning Cable Systems LLC, Hickory, NC (US)

( * ) Notice: Subject to any disclaimer, the term of this patent is extended or adjusted under 35 U.S.C. 154(b) by 280 days.

(21) Appl. No.: 13/348,929

(22) Filed: Jan. 12, 2012

(65) Prior Publication Data

US 2013/0183017 A1 Jul. 18, 2013

(51) Int. Cl.
*G02B 6/44* (2006.01)
*B65H 75/44* (2006.01)

(52) U.S. Cl.
CPC ............ *G02B 6/445* (2013.01); *B65H 75/4471* (2013.01); *B65H 75/4476* (2013.01); *G02B 6/4457* (2013.01); *B65H 2701/32* (2013.01); *G02B 6/444* (2013.01); *G02B 6/4452* (2013.01); *G02B 6/4455* (2013.01); *G02B 6/4458* (2013.01); *G02B 6/4466* (2013.01)

(58) Field of Classification Search
CPC .... G02B 6/444; G02B 6/4452; G02B 6/4455; G02B 6/4458
USPC .......................................................... 385/135
See application file for complete search history.

(56) References Cited

U.S. PATENT DOCUMENTS

| | | | |
|---|---|---|---|
| D63,519 S | 4/1867 | Horton | |
| 417,424 A | 12/1889 | Hochspeier et al. | |
| 2,046,883 A | 7/1936 | Robbins | |
| 2,170,764 A | 8/1939 | Penman | |
| 2,463,192 A | 3/1949 | Mackey et al. | |
| 2,511,701 A | 6/1950 | Eldredge | |
| 3,058,688 A | 10/1962 | Abel | |
| 4,381,087 A | 4/1983 | Williams | |
| 5,710,855 A * | 1/1998 | Konwitz | 385/135 |
| 6,301,424 B1 * | 10/2001 | Hwang | 385/135 |
| 6,571,047 B1 * | 5/2003 | Yarkosky et al. | 385/135 |
| 6,612,515 B1 * | 9/2003 | Tinucci et al. | 242/388.1 |

(Continued)

FOREIGN PATENT DOCUMENTS

| | | |
|---|---|---|
| CN | 2528753 Y | 1/2003 |
| JP | 5484580 U | 6/1979 |

(Continued)

OTHER PUBLICATIONS

Non-final Office Action for U.S. Appl. No. 13/275,815 mailed Jul. 17, 2014, 9 pages.

(Continued)

*Primary Examiner* — Ryan Lepisto
*Assistant Examiner* — Mary A El Shammaa

(57) ABSTRACT

A slack cable storage apparatus includes a housing having a top, a bottom, sides, a back extending between the top, bottom and sides thereby defining a storage volume and a cable opening extending through the housing. A spooling assembly is located in the storage volume. The spooling assembly includes a spooling member about which a cable is to be wound. A retainer is moveably connected to the spooling member. The retainer has a cable storing configuration where the retainer overlies a spooling volume adjacent the spooling member and a cable access configuration where the retainer is moved to allow access to the cable when spooled about the spooling member.

21 Claims, 5 Drawing Sheets

(56) References Cited

U.S. PATENT DOCUMENTS

| | | |
|---|---|---|
| 7,079,745 B1 | 7/2006 | Weinert et al. |
| 7,477,839 B2 | 1/2009 | Funahashi et al. ............ 385/147 |
| 2003/0038209 A1 | 2/2003 | Remeczky |
| 2003/0095772 A1* | 5/2003 | Solheid et al. ................ 385/134 |
| 2005/0201710 A1* | 9/2005 | Clark et al. ................... 385/135 |
| 2005/0226588 A1* | 10/2005 | Pons ............................ 385/135 |
| 2008/0292261 A1 | 11/2008 | Kowalczyk et al. |
| 2008/0296426 A1 | 12/2008 | Cairns et al. |
| 2010/0166376 A1 | 7/2010 | Nair et al. .................... 385/135 |
| 2012/0104145 A1 | 5/2012 | Dagley et al. |
| 2014/0054406 A1 | 2/2014 | Makrides-Saravanos et al. |

FOREIGN PATENT DOCUMENTS

| | | | |
|---|---|---|---|
| JP | 649965 U | 1/1989 | |
| JP | H6305682 A | 11/1994 | |
| WO | WO 2009/048680 A9 | 4/2009 | ............... G02B 6/44 |

OTHER PUBLICATIONS

Notice of Allowance for U.S. Appl. No. 13/275,815 mailed Nov. 13, 2014, 9 pages.

International Preliminary Report on Patentability for International patent application PCT/US2012/37082 mailed Nov. 19, 2013, 7 pages.

International Search Report for International patent application PCT/US12/37082 mailed Aug. 7, 2012, 5 pages.

Notice of Allowance for U.S. Appl. No. 13/275,815 mailed Jan. 27, 2015, 9 pages.

Chinese Search Report for Chinese Patent Application No. 2012800233763, mailed Mar. 20, 2015, 2 pages.

* cited by examiner

SLACK CABLE STORAGE APPARATUS

FIELD

The present invention relates generally to slack cable storage apparatus to store slack cable for use in dwelling units.

BACKGROUND

Increased demand for telecommunication services is resulting in fiber optic networks being extended into more and more areas, including multiple dwelling unit (MDU) applications. Slack cable storage can be an important consideration in the MDU applications, for example, when services are installed or repairs are needed. Slack cable can also offer a technician a comfortable space to operate. Often, cable storage enclosures are used to store subscriber fiber optic cable that can be connected to a network hub. However, the length of the fiber optic cable required may be unknown and/or may vary depending on the distance of a particular dwelling unit to the network hub. Accordingly, there is a need for providing slack cable storage apparatus for storing slack fiber optic cable that provides relatively easy access to the fiber optic cable.

SUMMARY

In one embodiment, a slack cable storage apparatus includes a housing having a top, a bottom, sides, a back extending between the top, bottom and sides thereby defining a storage volume and a cable opening extending through the housing. A spooling assembly is located in the storage volume. The spooling assembly includes a spooling member about which a cable is to be wound. A retainer is moveably connected to the spooling member. The retainer has a cable storing configuration where the retainer overlies a spooling volume adjacent the spooling member and a cable access configuration where the retainer is moved to allow access to the cable when spooled about the spooling member.

In another embodiment, a spooling assembly includes a base and a spooling member extending outwardly from the base about which a cable is to be wound. A retainer is moveably connected to the spooling member. The retainer has a cable storing configuration where the retainer overlies a spooling volume adjacent the spooling member and a cable access configuration where the retainer is moved to allow access to the cable when spooled about the spooling member.

In another embodiment, a method for slack cable storage includes winding a fiber optic cable about a spooling member of a spooling assembly located within a housing having a top, a bottom, sides, a back extending between the top, bottom and sides thereby defining a storage volume. A retainer moveably connected to the spooling member is moved to a cable storing configuration where the retainer overlies a spooling volume adjacent the spooling member.

Additional features and advantages of the claimed subject matter will be set forth in the detailed description which follows, and in part, will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Embodiments described herein generally relate to slack cable storage apparatus that can be used to store slack lengths of fiber optic cable for connection to dwelling units. The cable storage apparatus may include an openable enclosure including a housing defining a storage volume and an openable door moveably connected to the housing. A spooling assembly is located within the storage volume. The spooling assembly includes a spool member about which a length of fiber optic cable can be spooled. A hinged retainer is hingedly connected to the base structure. The hinged retainer has a cable securing configuration where the hinged retainer overlies a spooling volume within the enclosure to secure fiber optic cable spooled about the spooling member and a cable access configuration where the hinged retainer is moved to allow access to the fiber optic cable spooled about the spooling member.

Figure 1:
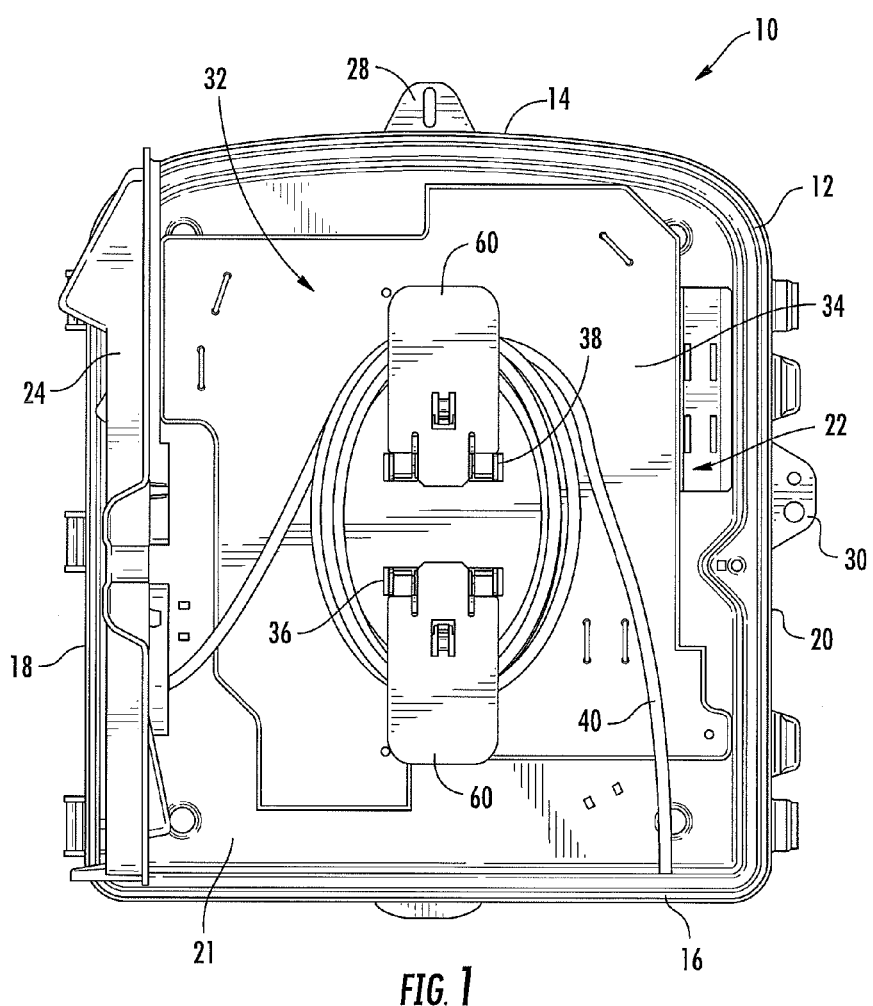
FIG. 1 is a front view of a slack cable storage apparatus including a spooling assembly according to an embodiment.
Figure 2:
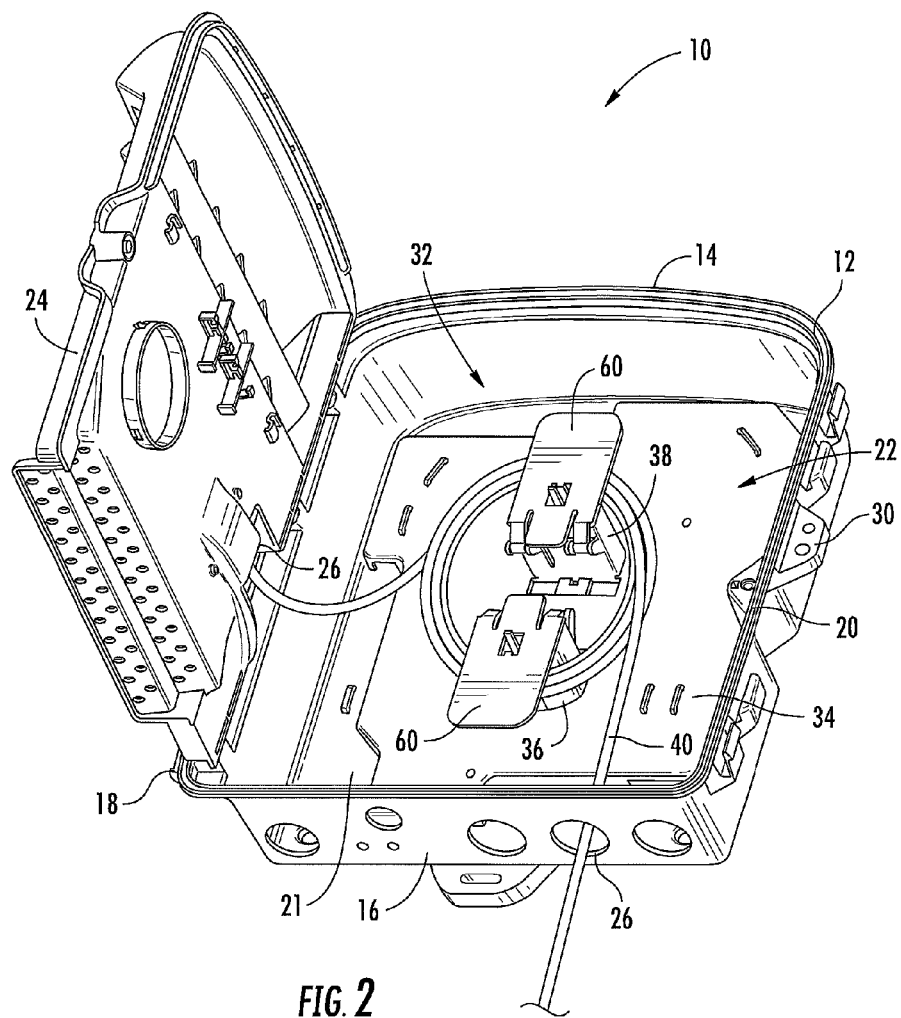
FIG. 2 is a perspective view of the slack cable storage apparatus of FIG. 1.

Referring to FIGS. 1 and 2, a slack cable storage apparatus 10 includes a housing 12 including a top 14, a bottom 16, sides 18 and 20 and a back 21 extending between the top 14, the bottom 16 and the sides 18 and 20 thereby forming a storage volume 22 therebetween. A cover or door 24 may be moveably connected to the housing 12 along any of the top 14, bottom 16 or sides 18 and 20. In the illustrated embodiment, the door 24 is hingedly connected to the housing 12 along the side 18. In other embodiments, the door 24 may not be hingedly connected to the housing 12 and instead may be completely removable from the housing 12. The housing 12 includes a number of cable openings 26 located along the side 18 and the bottom 16. Any number of openings 26 may be provided, depending at least in part on the needs of the particular installation. The housing 12 may include any number of hanging or mounting features 28 and locking features 30 that can be used to releasably lock the door 24 in a closed position to the housing 12.

Figure 3:
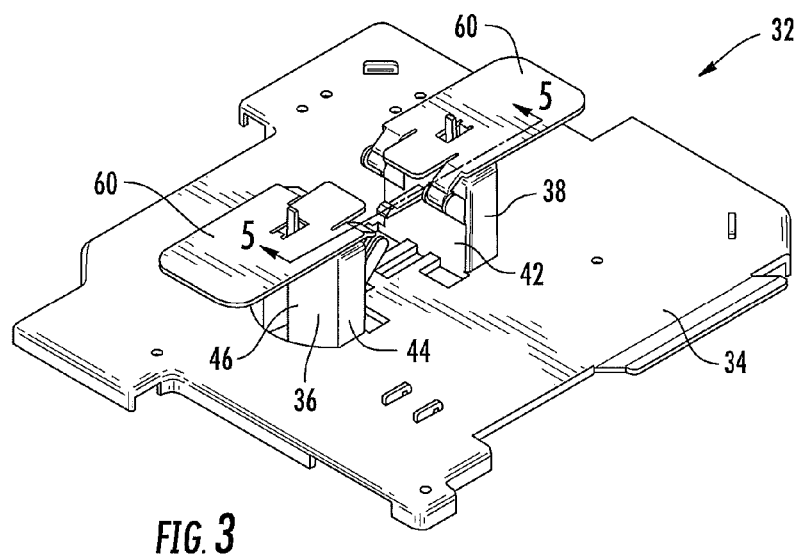
FIG. 3 is a perspective view of the spooling assembly of FIG. 1 shown in isolation.

A spooling assembly 32 is located in the storage volume 22. Referring also to FIG. 3, the spooling assembly 32 includes a base 34 that may be mounted to the back 21 of the housing 12. In other embodiments, the back 21 of the housing 12 may form the base 34. Spooling members 36 and 38 extend outwardly from the base 34. In some embodiments, the spooling members 36 and 38 may extend substantially perpendicularly to the base and/or be formed integrally of material forming the base 34, for example, during a molding process. In other embodiments, the spooling members 36 and 38 may be formed separately from the base 34 and then attached thereto and/or be formed of a different material than the base 34. The spooling members 36 and 38, while extending from the same base 34, may be spaced apart from each other on the base 34. Such a spaced arrangement for the spooling members 36 and 38 can provide minimum bend radius protection for a fiber optic cable 40 spooled about the spooling members 36 and 38 (FIGS. 1 and 2).

Figure 4:
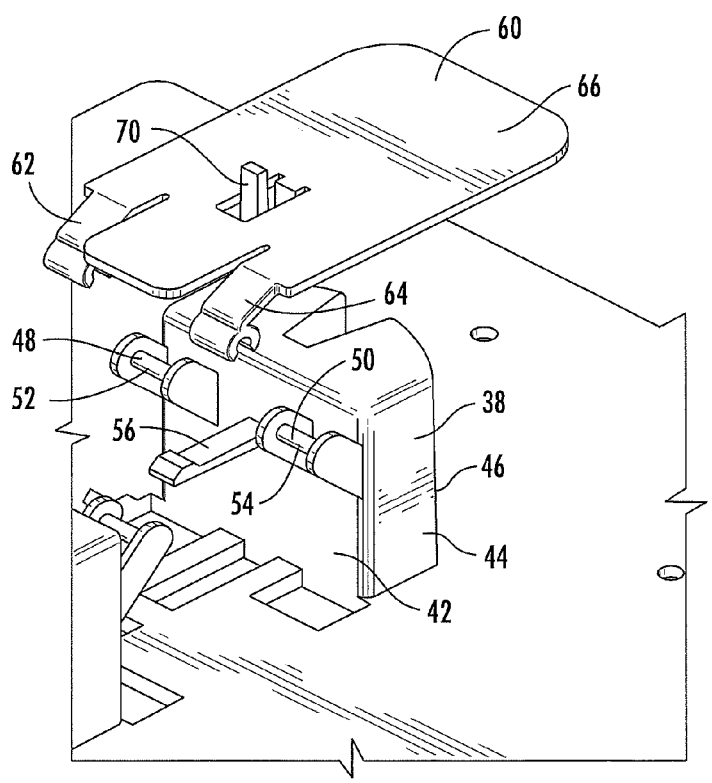
FIG. 4 is a detail, exploded view of a spooling member of the spooling assembly of FIG. 3.

Referring also to FIG. 4, each spooling member 36 and 38 includes an inner facing wall 42, sidewalls 44 and an outwardly facing wall 46. The outwardly facing walls 46 face away from each other and may have a rounded periphery to facilitate spooling of the fiber optic cable 40 therearound. The inner facing walls 42 face each other. Referring particularly to FIG. 4, each inner facing wall 42 includes hinge structures 48 and 50 having pivot axes 52 and 54 and a latch arm 56 extending outwardly from the inner facing walls 42. A retainer 60 may be hingedly attached to the pivot axes 52 and 54 using hinge connecting arms 62 and 64 that extend outwardly from a retaining body 66 of the hinged retainer 60. In some embodiments, the pivot axes 52 and 54 and the hinge connecting arms 62 and 64 provide a pivot axis for the hinged retainers 60 that is located between the spooling members 36 and 38 and is substantially parallel to the base 34.

Figure 5:
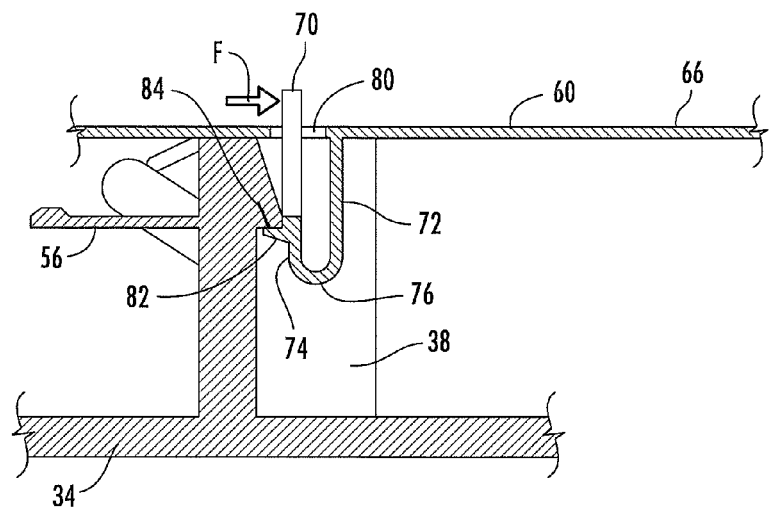
FIG. 5 is a section view along lines 5-5 of FIG. 3.

Referring to FIG. 5, each hinged retainer 60 further includes a locking tab 70 having a leg 72 that extends downwardly from the retaining body 66 and another leg 74 connected to the leg 72 by a bend 76 that extends upwardly beyond an opening 80 formed in the retaining body 66 to provide access to the locking tab 70. The leg 74 includes a catch 82 that engages a ledge 84 extending outwardly from the spooling member 38. When the catch 82 is releasably engaged with the ledge 84, the hinged retainer 60 is releasably locked in the illustrated cable securing configuration where the hinged retainer 60 overlies a spooling volume to secure fiber optic cable spooled about the spooling member 38. To release the locking tab 70, a force F is applied to the leg 74 above the retaining body 66 to disengage the catch 82 from the ledge 84. In some embodiments, the locking tab 70 is resiliently flexible such that it returns to its illustrated position once the force F is removed.

Figure 6:
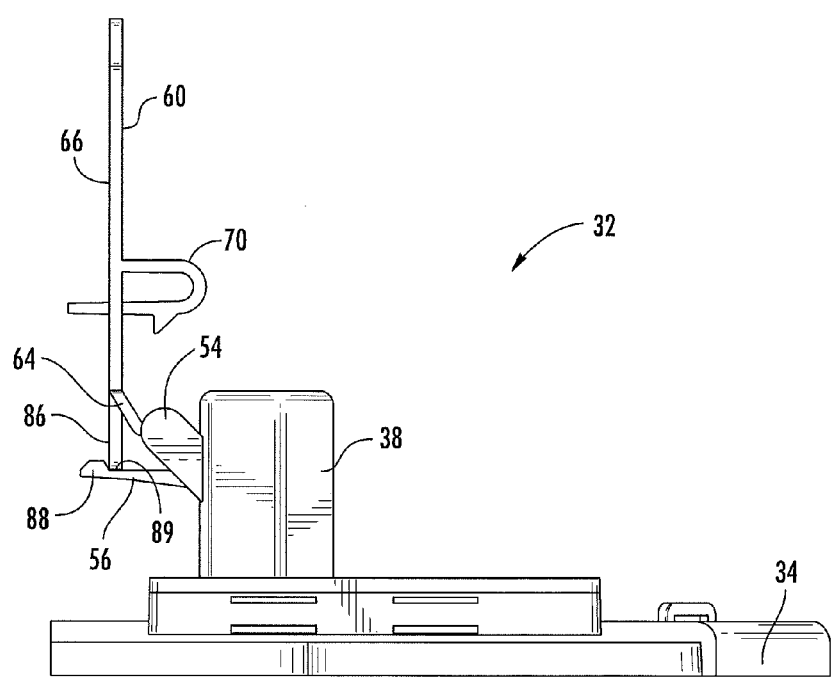
FIG. 6 illustrates operation of the spooling member of FIG. 3 and a hinged retainer according to an embodiment.

Referring now to FIG. 6, releasing the locking tab 70 allows the hinged retainer 60 to rotate about the pivot axes 52 and 54 using hinge connecting arms 62 and 64 to the outwardly extending, cable access configuration where the hinged retainer 60 is moved to allow access to the fiber optic cable spooled about the spooling member 38. The retaining body 66 includes a tongue portion 86 having a length that is sized to engage the latch arm 56 extending outwardly from the inner facing wall 42. The cantilevered latch arm 56 is resiliently flexible to allow the latch arm 56 to bend downwardly to allow an end 89 of the tongue portion 86 to move past a catch feature 88 of the latch arm 56. Once the end 89 clears the catch feature 88, the latch arm 56 returns to its undeflected position thereby releasably locking the hinged retainer 60 in the illustrated cable access configuration.

As can be seen by FIG. 6, in the cable access configuration, the retaining body 66 is located between the spooling members 36 and 38 and completely moved away from the spooling volume. Such a placement of the retaining body 66 away from the spooling volume can facilitate access to the fiber optic cable spooled around the spooling members 36 and 38. While spooling member 38 is discussed above, the spooling member 36 and its associated hinged retainer 60 may operate in a nearly if not identical fashion.

Figure 7:
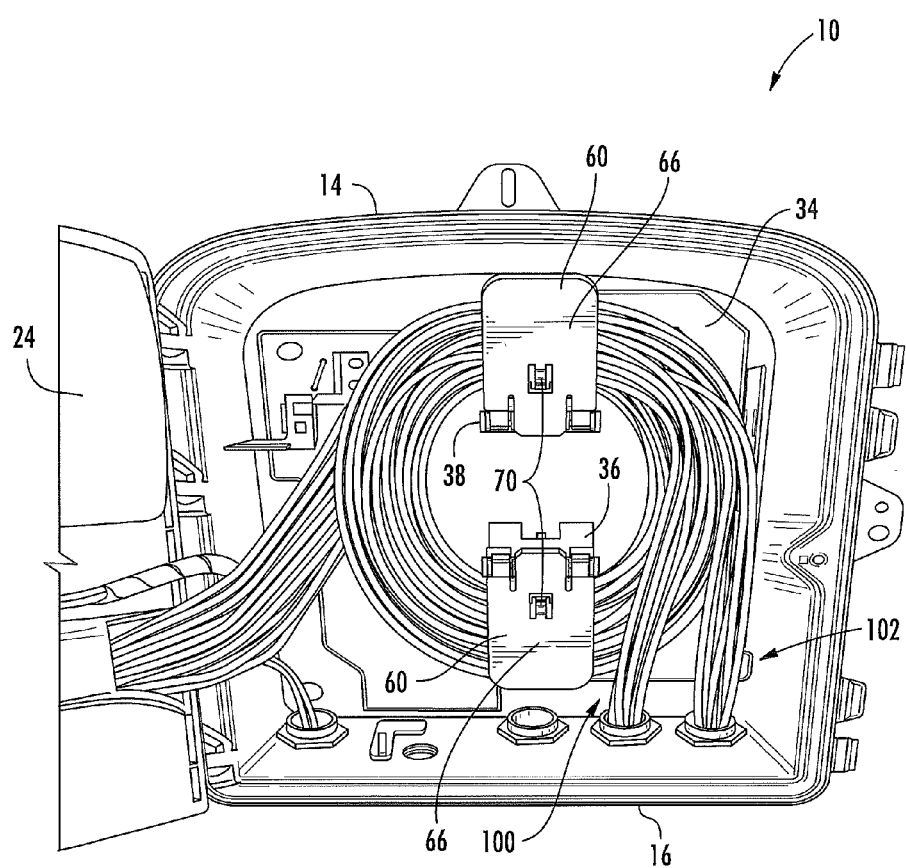
FIG. 7 a front view of a slack cable storage apparatus including a spooling assembly according to an embodiment.

Referring to FIG. 7, the cable storage apparatus 10 is shown in use with a first fiber optic cable bundle 100 and a second fiber optic cable bundle 102 spooled about the spooling members 36 and 38 of the spooling assembly 32 and facing the access opening, which is closed or opened using the door 24. Such spooling arrangements with the spooled fiber optic cable bundles 100 and 102 facing the operator or technician may be referred to as external spooling arrangements, in that the spool of fiber optic cables is not substantially hidden behind surfaces of the cable storage apparatus. In some embodiments, the fiber optic cable bundles 100 and 102 may be the same. In other embodiments, the first fiber optic cable bundle 100 may be different than the second fiber optic cable bundle 102, such as in cable length and/or in operation.

As illustrated, the hinged retainers 60 are both illustrated in their cable securing configurations where the retaining bodies 66 overlie the spooling volume occupied by the first and second fiber optic cable bundles 100 and 102. In some instances, the one or both of the hinged retainers 60 may overlie the entire width or extend beyond the width of the spooling volume occupied by the first and second fiber optic cable bundles 100 and 102 in their cable securing configurations. In other instances, one or both of the hinged retainers 60 may overlie only a portion of the width of the spooling volume occupied by the first and second fiber optic cable bundles 100 and 102 in their cable securing configurations. Additionally, in the illustrated embodiment, the hinged retainers 60 extend over the spooling volume in opposite directions (e.g., generally directed toward the top 14 and generally directed toward the bottom 16, respectively) in the cable securing configurations. In other embodiments, the hinged retainers 60 extend over the spooling volume in other directions and non-opposite directions.

As described above, to place the hinged retainers 60 in their cable access configurations, the locking tabs 70 are released by applying a force. Releasing the locking tabs 70 allow the hinged retainers 60 to rotate about their pivot axes to the outwardly extending, cable access configuration allowing access to the fiber optic cable spooled about the spooling member 38 (see FIG. 6). In this configuration, the hinged retainers 60 may extend toward and/or through the access opening.

It will be apparent to those skilled in the art that various modifications and variations can be made to the embodiments described herein without departing from the spirit and scope of the claimed subject matter. Thus, it is intended that the specification cover the modifications and variations of the various embodiments described herein, provided such modification and variations come within the scope of the appended claims and their equivalents.

What is claimed is:

1. A slack cable storage apparatus comprising:
  a housing having a top, a bottom, sides, a back extending between the top, bottom and sides thereby defining a storage volume and a cable opening extending through the housing; and
  a spooling assembly located in the storage volume, the spooling assembly comprising:
    a spooling member about which a cable is to be wound, the spooling member comprising a hinge structure having pivot axis about which a hinge may be rotated; and
    a retainer comprising at least one connecting arm configured to engage the hinge structure of the spooling member, the retainer configured to rotate about the pivot axis such that the retainer is movable between a cable storing configuration where the retainer overlies a spooling volume adjacent the spooling member and a cable access configuration where the retainer is moved to allow access to the cable when spooled about the spooling member.

2. The apparatus of claim 1, wherein the retainer extends outwardly toward an access opening to the storage volume in the cable storing configuration.

3. The apparatus of claim 1 further comprising a door that closes an access opening to the storage volume.

4. The apparatus of claim 1, wherein the spooling member is a first spooling member and the retainer is a first retainer, the apparatus further comprising:
   a second spooling member adjacent the first spooling member about which the cable is to be wound; and
   a second retainer moveably connected to the second spooling member, such that the second retainer is movable between a cable storing configuration where the second retainer overlies a spooling volume adjacent the spooling member and a cable access configuration where the second retainer is moved to allow access to the cable when spooled about the second spooling member.

5. The apparatus of claim 4, wherein the second retainer is hingedly connected to the second spooling member by a hinge.

6. The apparatus of claim 1, wherein the retainer further includes a locking tab that releasably locks the retainer to the spooling member with the retainer in the cable storing configuration.

7. The apparatus of claim 1, wherein the spooling member includes a latch arm extending outwardly from an inner facing wall of the spooling member, the latch arm engages a tongue portion of the retainer to releasably lock the retainer in the cable access configuration.

8. The apparatus of claim 1 further comprising a base from which the spooling member extends.

9. A spooling assembly comprising:
   a base;
   a spooling member extending outwardly from the base about which a cable is to be wound, the spooling member comprising a hinge structure having pivot axis about which a hinge may be rotated; and
   a retainer comprising at least one connecting arm configured to engage the hinge structure of the spooling member, the retainer configured to rotate about the pivot axis such that the retainer is movable between a cable storing configuration where the retainer overlies a spooling volume adjacent the spooling member and a cable access configuration where the retainer is moved to allow access to the cable when spooled about the spooling member.

10. The assembly of claim 9, wherein the retainer extends outwardly through an access opening to the storage volume in the cable storing configuration.

11. The assembly of claim 9, wherein the spooling member is a first spooling member and the retainer is a first retainer, the assembly further comprising:
    a second spooling member spaced apart from the first spooling member about which the cable is to be wound; and
    a second retainer moveably connected to the second spooling member, such that the second retainer is movable between a cable storing configuration where the second retainer overlies a spooling volume adjacent the spooling member and a cable access configuration where the second retainer is moved to allow access to the cable when spooled about the second spooling member.

12. The assembly of claim 11, wherein the second retainer is hingedly connected to the second spooling member by a hinge.

13. The assembly of claim 9, wherein the retainer further includes a locking tab that releasably locks the retainer to the spooling member with the retainer in the cable storing configuration.

14. The assembly of claim 9, wherein the spooling member includes a latch arm extending outwardly from an inner facing wall of the spooling member, the latch arm engages a tongue portion of the retainer to releasably lock the retainer in the cable access configuration.

15. A method for slack cable storage comprising:
    winding a fiber optic cable about a spooling member of a spooling assembly located within a housing having a top, a bottom, sides, a back extending between the top, bottom and sides thereby defining a storage volume, the spooling member comprising a hinge structure having pivot axis about which a hinge may be rotated; and
    rotating a retainer comprising at least one connecting arm engaging the hinge structure of the spooling member about the pivot axis from a cable access configuration where the retainer allows access to the cable when spooled about the spooling member to a cable storing configuration where the retainer overlies a spooling volume adjacent the spooling member.

16. The method of claim 15 further comprising moving the retainer to the cable access configuration.

17. The method of claim 15 further comprising releasably locking the retainer in the cable storing configuration using a locking tab.

18. The apparatus of claim 1, wherein the retainer extends substantially perpendicular to the spooling member when the retainer is in the cable storing configuration; and
    wherein the retainer extends substantially parallel to the spooling member when the retainer is in the cable access configuration.

19. The spooling assembly of claim 9, wherein the retainer extends substantially perpendicular to the spooling member when the retainer is in the cable storing configuration; and
    wherein the retainer extends substantially parallel to the spooling member when the retainer is in the cable access configuration.

20. The method of claim 15, wherein moving the retainer to a cable storing configuration comprises moving the retainer to a position substantially perpendicular to the spooling member.

21. The method of claim 16, wherein moving the retainer to a cable access configuration comprises moving the retainer to a position substantially parallel to the spooling member.

* * * * *